Figure 1:
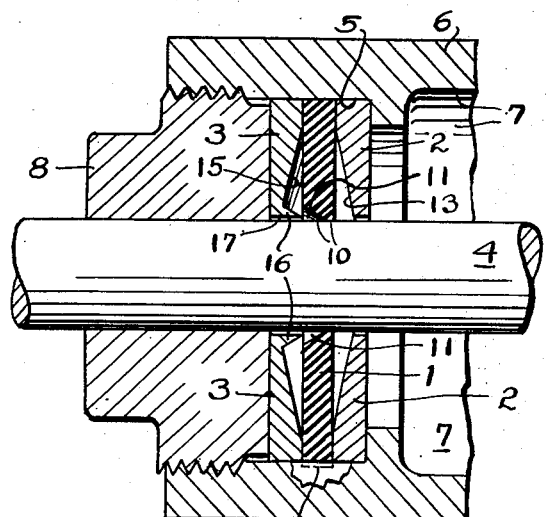

INVENTOR.
LEROY J. CAREY
BY George M. Soule
Attorney

Patented Feb. 6, 1945

2,368,744

UNITED STATES PATENT OFFICE 2,368,744

SEALING UNIT

Leroy J. Carey, Lakewood, Ohio, assignor to The Marquette Metal Products Company, Cleveland, Ohio, a corporation of Ohio Application September 19, 1942, Serial No. 458,962

7 Claims. (Cl. 286—26)

This invention relates to a novel fluid sealing unit particularly for relatively reciprocating cylindrical parts, for example (a) a valve or plunger stem and a guide for the stem and (b) piston and cylinder assemblies. The above indicates the general object.

Another object is to provide a seal assembly or unit for reciprocating parts such as mentioned, which seal assembly or unit will be highly effective both for sealing at low or static pressures and for sealing at very high continuously or intermittently applied working pressures.

A further object is to provide a sealing unit for a shaft or part subjected at times to reciprocating movements or compound reciprocating and rotary movement in respect to cooperating parts, which unit will be more positive in action than prior devices of its general class; will operate with relatively low friction; will be unusually free from wear; and which is adapted to seal fluid at high pressure on one side only of the sealing unit or (by simple modification) both sides or either side.

Specific objects are: to provide an improved sealing unit adapted for association with the guide of a reciprocably movable shaft or rod regardless of the nature or use thereof, and an improved sealing unit adapted to be carried by a reciprocating part such as a piston for sealing contact with a cooperating cylinder.

Other objects and features of the invention will become apparent from the following description of the preferred forms shown in the drawing. The essential characteristics are summarized in the claims.

Figure 2:
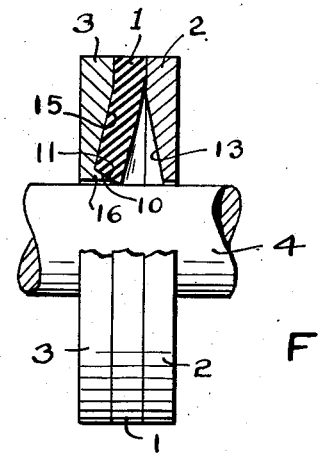
Figure 3:
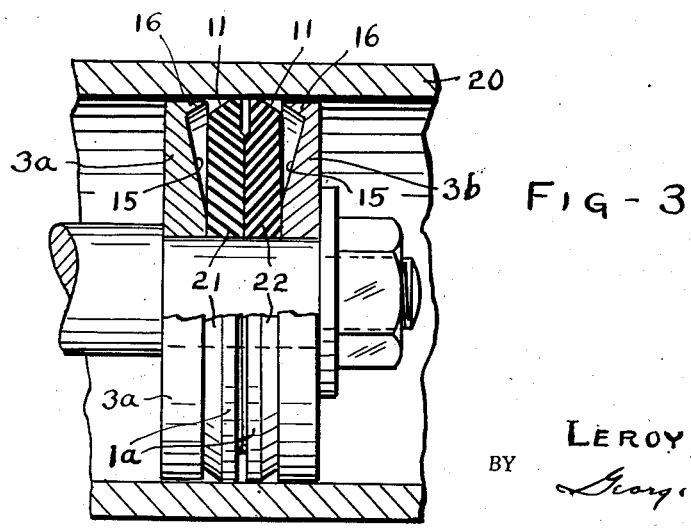

In the drawing, Fig. 1 is a central longitudinal sectional view of the sealing unit assembly as used, for example, to seal a high fluid pressure chamber around an operating stem which reciprocates, as in opening and closing a valve or moving a piston or plunger in said chamber; Fig. 2 is a similar view of the unit showing approximately the manner in which the seal operates when subjected to high pressure from one side or when the stem is moved in one direction, and Fig. 3 is a central sectional assembly view of a modification of the unit in the form of a piston packing or sealing ring for contact with a cylinder wall.

One practical application for the sealing unit hereof (design according to Figs. 1 and 2), which application illustrates the effective operation of the unit under high fluid pressure as well as under static or continued low pressure is in connection with a so-called shut-off plunger of a feathering valve apparatus for adjustable pitch, airplane propellers. Such a plunger is shown in United States Patent 2,225,082 (Fig. 3, attention being directed to part 71—72). The stem of the plunger is subjected to very high oil pressure during feathering, but afterward the pressure drops to low value and remains at low value until another feathering operation is effected. Leakage along the stem must be prevented under both conditions, but very frequently sealing units found to work perfectly under one condition fail to operate properly under the other.

The sealing unit, Figs. 1 and 2, comprises an annular sealing disc or diaphragm 1 of flexible elastic material, and rigid (e. g. metal) retainer washers 2 and 3 between which the outer margin of the disc is held for contact at the inner peripheral edge with the plunger stem or rod 4. In the construction shown the sealing disc and retaining washers are maintained as a unit in position in a recess 5 of a casing 6, the interior or pressure space of the casing being indicated at 7. A retainer for the sealing unit assembly is shown in the form of a threaded sleeve or nut 8 abutting the washer 3.

The washer 2, being toward the side of the unit which is subjected to above-atmospheric pressure, will, for convenience, be termed herein the inner washer, 3 the outer washer. In practice the unit would usually have a jacket (not shown) positioned around the outer peripheral surfaces of the sealing disc and both washers, and with inturned flanges abutting the opposite margins of respective washers, so that the unit may constitute a self-contained assembly. The flanges, in that event, could be so spaced as to maintain any desired clamping pressure of the washers on the outer margins of the sealing disc or diaphragm 1. In any event, when the unit is installed, the washers 2 and 3 are intended to be pressed toward the sealing disc at all outer margins thereof with sufficient force to prevent all radially outward portions of the disc from moving in any direction.

It may be assumed that flow of fluid from the chamber 7 around the outer surface of the sealing unit is effectively blocked as by the usual methods not necessary to be described here.

The sealing disc or diaphragm 1 is a flat circular ring, the composition of which is selected in accordance with the character of the fluid to be blocked thereby and other variables, sizes; pressures, etc. In case the fluid is hydrocarbon then the preferred material is neoprene or other synthetic rubber, several types of which are suitable for respectively different specific uses of the sealing unit hereof. The hole 10 in the disc 1 is partly cylindrical and made accurately of such size as to be expanded slightly by the rod or stem 4. The cylindrical portion of the hole 10 is disposed toward the inner washer 2. The hole 10 has a frusto-conical chamfer portion 11 diverging toward the outer washer 3 for purposes to be explained later herein.

In some cases the sealing disc 1, particularly when of large size, can be made from several layers of material intimately bonded together (not illustrated), one or more of which layers constitutes or constitute reinforcement for the elastic sealing constituent of the disc. Any known or suitable means (e. g. cord, fabric or other grommet or inner embedded layer) may be used to reinforce the elastic material when found necessary. In a seal for up to a three eighths inch diameter rod and pressures up to 3,000# the disc (in case of oil) is preferably simply a single piece of neoprene in the neighborhood of 30 durometer grade. The discs 1 can be cut from sheet stock, in which case the chamfer 11 of the central opening 10 usually has to be ground accurately to proper size and angle of chamfer.

The inner (high pressure side) metal washer 2 has a shallow dished surface 13 (frusto-conical as shown) on the side toward the sealing disc. The angle of divergence of the dished surface (exact angle not important) is such as to allow the central free portion of the sealing disc to flex and turn toward the washer until the disc has only substantially a line contact with the rod 4. The disc usually flexes in this manner (due to frictional contact with the rod) when the rod is moved inwardly of the casing 6. The inner hole in the metal washer 2 may be slightly larger than the rod (for working clearance).

The outer metal washer 3 is of special shape, being dished at 15 similarly to the surface 13 of washer 2 for reception of the free central part of the sealing disc when flexed theretoward; but inwardly from the dished portion and closely adjacent the rod 4, the washer 3 has a relatively steeply sloping frusto-conical annular flange 16 which converges to a thin edge toward the sealing disc. The inner surface of the flange is continued from the central cylindrical hole 17 in the washer 3 which hole, as in the case of the washer 2, just clears the rod all around it.

In an embodiment of the sealing unit which met all practical tests for its intended use, both static and at working pressures as high as 3,000# the included angle of the conical flange was 75° and the chamfer 11 on the sealing disc had approximately the same included angle. The angles of both the flange and chamfer could be altered considerably, of course, but the angle of both should be approximately the same in each sealing unit in order that the flange will afford uniform support for all contacting portions of the disc when the latter flexes to the position shown in Fig. 2.

The sealing unit shown in Figs. 1 and 2 as described above is for sealing or blocking fluid flow along the rod or stem 4 in but one direction, namely, outwardly from the chamber 7. In making a two-way seal in accordance herewith, two washers 3 would be used and the washer 2 omitted, the sealing disc 1 would then be formed on both sides as it is on the side adjacent the washer 3, in other words, would have two conical chamfered surfaces 11 and a short connecting cylindrical surface.

Fig. 2, as noted previously herein, shows the sealing disc 1 in operation as when subjected to fluid pressure from chamber 7 sufficient to force the generally central or free portion of the disc into full contact with the washer 3 (or when moved approximately to that position by following the rod 4 in movement of the latter outwardly with reference to the sealing unit). The disc 1, at the central cylindrical portion of the hole 10, maintains nearly line contact with the rod which contact is ideal for sealing so long as the flexible disc is blocked against further outward movement. At the same time the friction of the disc 1 opposing lengthwise movement of the rod is reduced to a minimum by reason of the line contact. So long as the line contact (brought out in Fig. 2) is maintained by substantial overbalance of outward fluid pressure on the flexible sealing disc, the rod 4 can be moved back and forth any allowed distance without disturbing said line contact relationship of the disc and rod.

The reduced friction, obviously greatly lengthens the effective life of the seal and facilitates lubrication. There is always some supply of fluid maintained in the cavity formed between the inner washer 2 and the sealing disc for lubrication of the sealing surface adjacent the rod 4 and the cavity, as one of its functions, tends to preserve such lubricant supply. Also although the sealing unit very effectively prevents leakage outwardly past the sealing disc there is always sufficient oil film slip so that oil is maintained on the conical surface of the flange 16 for further supplying lubrication as the disc 1 moves to normal position (Fig. 1) under low pressure conditions inside the chamber 7. The matter of lubrication is, of course, highly important because if the sealing surface of the disc 1 adjacent the rod gets dry it tends to gall. The continuously maintained line or near-line contact of the seal at high pressure obviously reduces the problem of lubrication and likelihood of galling.

It should be borne in mind that when a seal comprising a flat elastic disc or elastic packing ring is held in fixed position (against flexing), as between metal washers on both sides, then not only is true line contact sealing impossible to attain but the friction force must be greater than required by the present construction with increased tendency to obstruct lubrication and produce galling. Moreover, when the rod is reciprocated it tends to extrude the sealing material into the clearance spaces of the washer holes.

In such prior seals the yielding material of the disc or ring has initially to be made considerably undersize at the hole which receives the shaft or rod in order to compensate for wear; and usually the friction added thereby is considerable and the tendency for the seal to run dry and then gall is, of course, increased. My new arrangement is not subject to those disadvantages. In regard to extrusion the disc 1 in flexing, as into the position shown in Fig. 2, is definitely guided, by the conical flange 16 and cooperating chamfer 11, away from the clearance space between the washer 3 and the rod.

Fig. 3 illustrates in a general way the use of conical flanges on both resilient-disc-retaining metal washers of the sealing unit. However, Fig. 3 is mainly to show a reversal of the arrangement of Figs. 1 and 2 in order to make an effective sealing ring for pistons and equivalent arrangements where an axially moving element carries the seal rather than a fixed element of the combination in which the seal is used. In Fig. 3 it is assumed that both sides of the piston constituted by the sealing unit 1a, 3a and 3b are subjected to high pressure hence the employment of conical flanges 16 on both retaining washers or plates 3a and 3b and chamfered surfaces 11 at both sides of the flexible sealing disc.

In order that the same line contact relationship between the pressure-flexed sealing disc and coacting surface (in this case the inner wall of cylinder 20) may be preserved during the high-pressure-sealing operation of the unit, the flexible elements may be made as two identical discs 21 and 22 separate from each other and placed back to back as clearly shown. The same device would or could be utilized in making a two-way-acting seal of the type illustrated by Figs. 1 and 2.

The operation of a unit according to Fig. 3 will be understood from the foregoing description of Figs. 1 and 2, said operation being essentially the same in both forms.

While the particular forms shown are arranged for sealing relatively reciprocating parts it will be clear that the novel principles are applicable to relatively rotating parts and parts subjected to combined rotary and reciprocating motion.

I claim:

1. A sealing unit for operation against a cylindrical surface, said unit comprising a flexible disc having a peripheral surface adjacent one margin adapted for continuous sealing contact with said cylindrical surface, substantially rigid means supporting a portion of the disc radially removed from said margin in a manner to prevent flexing of that portion and including means adjacent said margin normally in axially spaced relation to the disc for a distance which will enable free flexing of said marginal portion a considerable distance axially of the cylindrical surface, and a substantially rigid annular abutment on the latter means directed radially away from the cylindrical surface and positioned for peripherally continuous supporting contact with a portion of said peripheral portion of the disc when said marginal portion of the disc flexes thereto-ward while another portion of the peripheral surface of the disc remains in wiping sealing contact with the cylindrical surface.

2. A seal of the class described comprising a flexible disc or ring of materially greater breadth than thickness, having a peripheral relatively narrow edge portion of substantially cylindrical form adapted to effect full face contact with a cylindrical surface adjacent which sealing is desired and having a peripherally continuous chamfer surface adjacent said narrow edge portion, and retaining means for the disc or ring which means enables the entire marginal portion of the disc or ring supporting said chamfer and narrow edge portion to flex freely axially along such cylindrical surface, said retaining means including an annular flange generally complementary to the chamfer and having an acting face directed radially away from said cylindrical surface for radially abutting contact with the chamfer surface when such flexing of said marginal portion occurs.

3. A sealing unit comprising a flat flexible sealing disc or ring, rigid means on opposite sides of the disc or ring supporting the same continuously in substantially fixed position at one peripheral surface portion of the disc or ring, said means including a rigid member axially adjacent the disc or ring and having a relatively broad surface portion gradually departing from the disc or ring in an axial direction, so as to enable limited free flexing of another marginal portion of the disc or ring axially thereof, said rigid member having also an abrupt shoulder portion adjacent the free flexing margin of the disc or ring and of generally conical form presenting a thin edge for receiving an edge portion of the disc or ring into radially abutting contact therewith.

4. A shaft or rod seal comprising a flexible disc and two rigid retaining washers for the disc, said washers being relatively recessed to provide a free space between them wider than the disc for enabling the inner margin of the disc to flex lengthwise of the shaft or rod continuously around the same, one of the washers having an annular flange closely surrounding the shaft or rod and presenting a relatively thin edge toward the flexible disc for radially outward abutting contact with the adjacent peripheral edge portion of the disc as the disc flexes thereto-ward.

5. A seal according to claim 4 wherein said washer which supports the flange is dished inwardly toward the center of the rod on the side thereof adjacent the flexible disc for affording at least part of the flexing space for the flexible disc.

6. A seal according to claim 4 wherein both washers are dished on the side thereof toward the flexible disc so as to provide a generally V-shaped void around the shaft or rod for enabling said free flexing of the disc.

7. A seal for a piston or the like in contact with a cylinder, comprising a disc of flexible material, which disc is relatively thin in an axial direction as compared to the diameter of the disc, means on opposite sides of the disc including means for rigidly supporting the disc when the latter moves in one direction axially and retaining the same in a manner permitting the entire outer marginal portion of the disc to flex axially a considerable distance, and rigid annular flange means of generally conical form on the piston or the like arranged for radial inwardly abutting contact with an outer peripheral surface of the disc as the same flexes thereto-ward.

LEROY J. CAREY.